(12) United States Patent
Tian et al.

(10) Patent No.: US 8,760,587 B2
(45) Date of Patent: Jun. 24, 2014

(54) REMOTE CONTROL DEVICE FOR 3D VIDEO SYSTEM

(75) Inventors: Dong Tian, Boxborough, MA (US); Peng Yin, Ithaca, NY (US); Wang Lin Lai, Richardson, TX (US); Zhenyu Wu, Plainsboro, NJ (US); Chad Andrew Lefevre, Indianapolis, IN (US)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 13/879,211

(22) PCT Filed: Oct. 14, 2010

(86) PCT No.: PCT/US2010/002746
§ 371 (c)(1),
(2), (4) Date: Apr. 12, 2013

(87) PCT Pub. No.: WO2012/050544
PCT Pub. Date: Apr. 19, 2012

(65) Prior Publication Data
US 2013/0194511 A1    Aug. 1, 2013

(51) Int. Cl.
*H04N 5/44*    (2011.01)

(52) U.S. Cl.
USPC ........... 348/734; 348/723; 348/785; 348/827; 348/831; 348/553; 348/563; 348/565; 348/569; 348/570; 348/581; 348/114; 348/161; 348/211.99; 348/42; 348/54; 348/14.01; 348/14.03; 348/14.05; 348/14.16; 345/158; 345/157; 345/156; 345/159; 725/34; 725/37; 725/38; 725/40; 725/44; 725/59; 725/67; 725/68; 725/86; 725/106

(58) Field of Classification Search
USPC ............ 348/734, 14.01, 14.03, 14.05, 14.16, 348/42, 54, 723, 785, 827, 831, 553, 563, 348/565, 569, 570, 581; 345/158, 157, 156, 345/159; 725/34, 37, 38, 39, 40, 44, 59, 67, 725/68, 86, 106
See application file for complete search history.

(56) References Cited

U.S. PATENT DOCUMENTS

| 5,614,906 | A | * | 3/1997 | Hayes et al. ................. 341/176 |
| 5,714,997 | A | | 2/1998 | Anderson |
| 6,424,285 | B1 | | 7/2002 | Perdue et al. |
| 6,747,568 | B1 | | 6/2004 | Teskey |

(Continued)

FOREIGN PATENT DOCUMENTS

| EP | 0 956 549 B1 | 4/2002 |
| EP | 1 617 684 A1 | 1/2006 |

(Continued)

*Primary Examiner* — Jefferey Harold
*Assistant Examiner* — Mustafizur Rahman
(74) *Attorney, Agent, or Firm* — Robert D. Shedd; Reitseng Lin (57) ABSTRACT

A remote control device is operative to enable and facilitate user control of video systems that are operative to provide one or more three-dimensional (3D) viewing effects. According to an exemplary embodiment, the remote control device includes a user input terminal having an input element operative to receive user inputs to adjust at least one of a volume setting and a channel setting of a video system, and further operative to receive user inputs to adjust a three-dimensional (3-D) viewing effect of the video system. A transmitter is operative to transmit control signals to the video system in response to the user inputs.

17 Claims, 9 Drawing Sheets

(56) References Cited

U.S. PATENT DOCUMENTS

| | | |
|---|---|---|
| 8,217,894 B2 * | 7/2012 | Choi .............................. 345/158 |
| 2002/0126202 A1 | 9/2002 | Wood et al. |
| 2002/0133310 A1 * | 9/2002 | Tamura ........................ 702/139 |
| 2005/0185711 A1 | 8/2005 | Pfister et al. |
| 2008/0106517 A1 * | 5/2008 | Kerr et al. ..................... 345/158 |
| 2009/0295719 A1 * | 12/2009 | Choi .............................. 345/158 |
| 2010/0014005 A1 * | 1/2010 | Yano et al. .................... 348/734 |
| 2010/0052847 A1 * | 3/2010 | Mortensen ................... 340/5.53 |
| 2010/0091098 A1 * | 4/2010 | Yoshifuji et al. ................ 348/54 |
| 2010/0171698 A1 * | 7/2010 | Kim et al. ..................... 345/158 |
| 2010/0182515 A1 * | 7/2010 | Lou ............................... 348/734 |
| 2010/0238264 A1 * | 9/2010 | Liu et al. .................... 348/14.13 |

FOREIGN PATENT DOCUMENTS

| | | |
|---|---|---|
| JP | 2001-204089 | 7/2001 |
| JP | 2002-186061 | 6/2002 |
| KR | 0170663 | 4/1999 |

* cited by examiner

REMOTE CONTROL DEVICE FOR 3D VIDEO SYSTEM

This application claims the benefit, under 35 U.S.C. §365 of International Application PCT/US2010/002746, filed Oct. 14, 2010, which was published in accordance with PCT Article 21(2) on Apr. 19, 2012 in English.

BACKGROUND OF THE INVENTION

1. Field of the Invention

The present invention generally relates to remote control devices for video systems, and more particularly, to remote control devices that enable and facilitate user control of video systems that are operative to provide, among other things, one or more three-dimensional (3D) viewing effects.

2. Background Information

Current video systems that provide a three-dimensional (3-D) viewing effect are known to only support a stereo three-dimensional (3-D) display mode and a conventional two-dimensional (2D) display mode. The switch control between these two display modes is relatively simple. For example, such systems may utilize an on-screen menu to enable user selection between the two display modes. Another way to enable switching between these two display modes is to provide a dedicated button (e.g., 2D/3D button) on a remote control device, which when pressed, will switch between the two display modes.

Other than simply switching between three-dimensional (3-D) and two-dimensional (2D) display modes, however, current video systems are not known to provide users with the ability to adjust any three-dimensional (3-D) view settings, or three-dimensional (3-D) related image quality. This limitation of current video systems may be based, at least in part, on the fact that in the current three-dimensional (3-D) display mode, each video frame provides only two views (i.e., right view and a left view). In the future, however, it is anticipated that video systems having a three-dimensional (3-D) viewing effect will support more than two views for each video frame, as well as other possible new features.

Accordingly, in view of such future video systems having a three-dimensional (3-D) viewing effect, there is a need in the art to enable and facilitate user control of such video systems so as to provide users with the ability to adjust one or more three-dimensional (3-D) view settings. The present invention described herein addresses these and/or other issues, and provides a plurality of different embodiments for devices that advantageously enable users to, among other things, adjust one or more three-dimensional (3-D) view settings of a video system.

SUMMARY OF THE INVENTION

In accordance with an aspect of the present invention, a remote control device is disclosed. According to an exemplary embodiment, the remote control device comprises a user input terminal having an input element operative to receive a first user input to adjust at least one of a volume setting and a channel setting of a video system, and further operative to receive a second user input to adjust a three-dimensional (3-D) viewing effect of the video system. A transmitter is operative to transmit control signals to the video system in response to the first and second user inputs.

In accordance with another aspect of present invention, another device is disclosed. According to an exemplary embodiment, the device comprises means for receiving a user input requesting a video system to adjust a three-dimensional (3-D) viewing effect by changing a current three-dimensional (3-D) view setting to another three-dimensional (3-D) view setting, and means for transmitting a control signal to the video system in response to the user input.

In accordance with yet another aspect of the present invention, a method for operating a remote control device is disclosed. According to an exemplary embodiment, the method comprises receiving, via an input element of the remote control device, a first user input to adjust at least one of a volume setting and a channel setting of a video system; receiving, via the input element, a second user input to adjust a three-dimensional (3-D) viewing effect of the video system; and transmitting control signals to the video system in response to the first and second user inputs.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DESCRIPTION OF THE PREFERRED EMBODIMENTS

Figure 1:
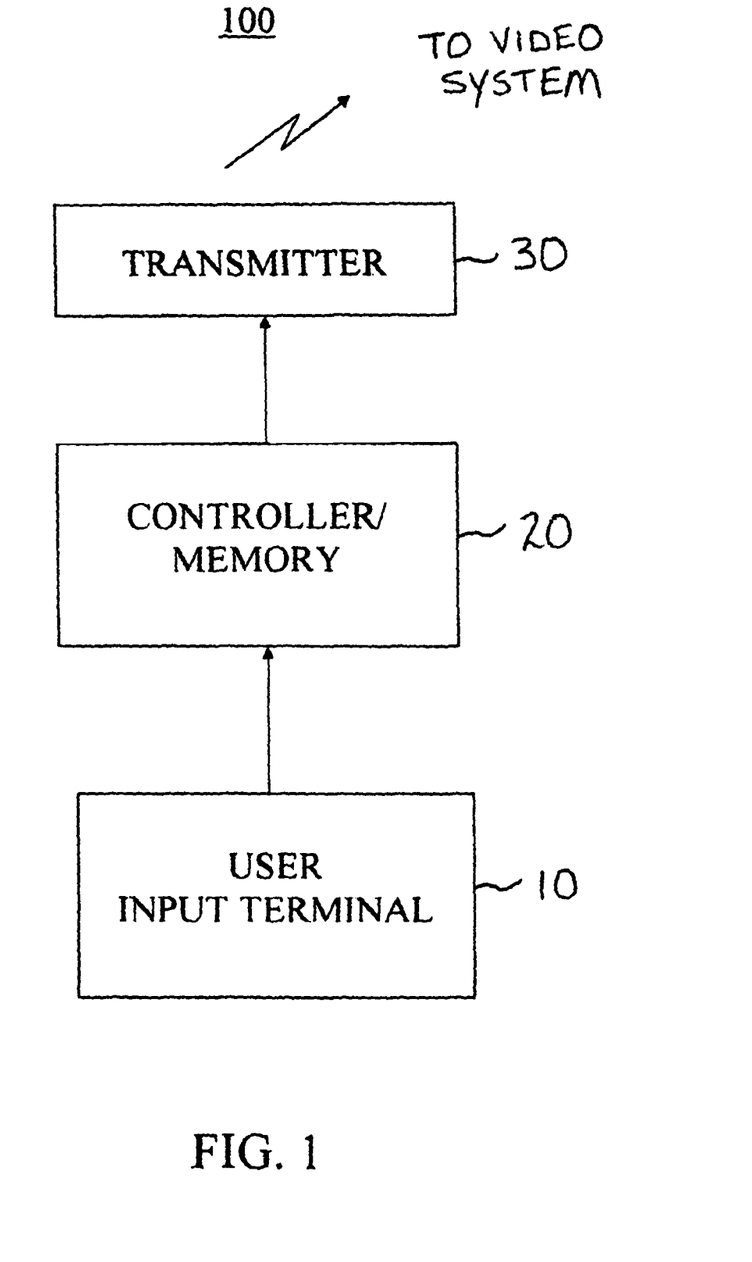
FIG. 1 shows a general block diagram of a remote control device according to exemplary embodiments of the present invention.

Referring now to the drawings, and more particularly to FIG. 1, a general block diagram of a remote control device 100 according to exemplary embodiments of the present invention is shown. According to the exemplary embodiments described herein, remote control device 100 is operative to control one or more video systems (e.g., televisions, set-top boxes, etc.) that are each operative to provide, among other things, one or more three-dimensional (3-D) viewing features. As shown in FIG. 1, remote control device 100 comprises user input means such as user input terminal 10, control/storage means such as controller/memory 20, and signal transmitting means such as transmitter 30. Remote control device 100 may be embodied as any type of remote control device, and may for example include mechanical and/or electronic (e.g., LED) elements.

User input terminal 10 is operative to receive user inputs to remote control device 10. According to an exemplary embodiment, user input terminal 10 comprises one or more user input elements, such as a numerical keypad, dedicated function adjustment keys and/or other input elements such as a rotating device (e.g., wheel), slider, touch-pad, etc. The user input elements of user input terminal 10 may also be configured so that two or more control functions (e.g., channel change, volume change, 3-D view changes, etc.) may be shared by a single input element.

Controller/memory 20 is operative to perform various control, signal processing and data storage functions associated with remote control device 10. According to an exemplary embodiment, controller/memory 20 receives and processes the input signals provided by user input terminal 10, and generates corresponding control signals which are provided to transmitter 30.

Transmitter 30 is operative to perform a signal transmitting function of remote control device 10. According to an exemplary embodiment, transmitter 30 wirelessly transmits control signals to a video system in response to the control signals received from controller/memory 20. The control signals may be wirelessly transmitted by transmitter 30, for example, as infrared (IR) and/or radio frequency (RF) signals.

It should be noted that the principles of the invention can be applied to control device, such as a front panel array, attached to a video system. In this embodiment, the controller 20 can be the system controller itself or a separate controller other than the system controller. The transmitter 30 in this embodiment is just the component that transmits the control signals via a wire connection to the controller 20. As such, the term "remote control device" as used herein may include control device attached to a video system.

The general block diagram of remote control device 100 in FIG. 1 may be utilized for various different embodiments of the present invention, and each of these embodiments may present a user with a different set of input and/or display elements, and hence a different perspective view. A number of such preferred embodiments are shown in FIGS. 2-6, and will be described hereinafter. According to exemplary embodiments of the present invention, remote control devices having the general structure of remote control device 100 are operative to perform and enable various remote control functions of one or more video systems, including the ability to adjust one or more three-dimensional (3-D) viewing effects.

According to principles of the present invention, the various embodiments of remote control device 100, as represented for example in FIGS. 2-6, enable user control and adjustment of at least one of the following three-dimensional (3-D) viewing effects: a view change effect, a depth change effect and a pop-out effect. While current three-dimensional (3-D) video systems are known to support only two different views (i.e., right view and a left view) per video frame, the principles of the present invention are applicable to three-dimensional (3-D) video systems that support more than two different views per video frame. The aforementioned three-dimensional (3-D) viewing effects will now be described.

View Change Effect

Future three-dimensional (3-D) video systems should be able to support multi-view or free viewpoint features. In the H.264/MPEG-AVC MVC extension, for example, up to 1024 views for each video frame can be supported. According to principles of the present invention, the user is able to select any view he/she wants to watch. According to an exemplary embodiment, when a view change effect occurs, both a left view and a right view are changed at the same time. Also according to an exemplary embodiment, given that each video frame of a received video signal has at least three different views, the user may designate one of these views as the right view and another one of the views as the left view when adjusting the view change effect.

Figure 2:
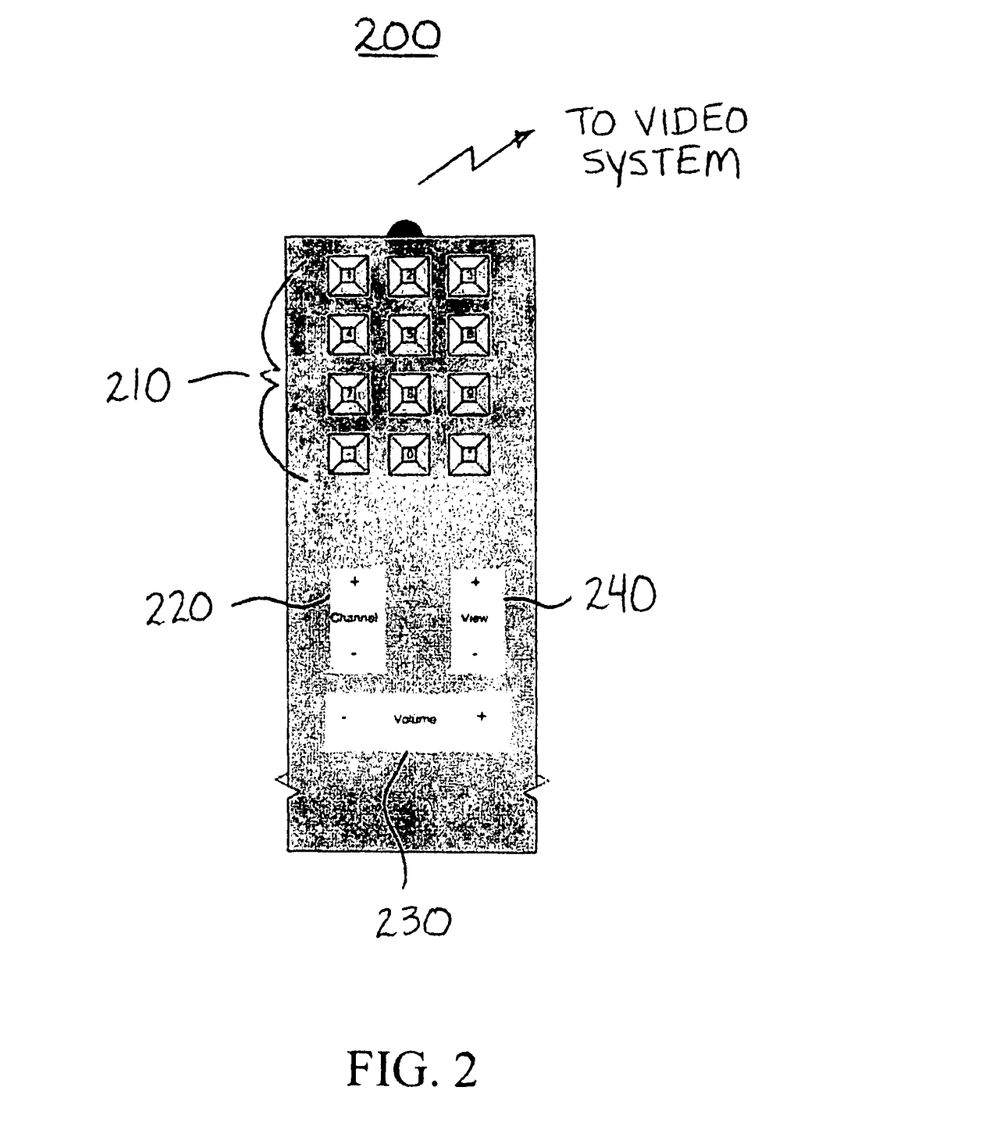
FIG. 2 shows a user perspective view of a remote control device according to an exemplary embodiment of the present invention.

Also according to an exemplary embodiment, a dedicated key of the remote control device with ("+") and ("−") indicators may be used to increase ("+") or decrease ("−") the view indices, and thereby adjust the view change effect. FIG. 2 shows an example of a remote control device 200 operative to perform this adjustment. In particular, remote control device 200 of FIG. 2 comprises a numerical keypad 210, a dedicated channel change key 220 for changing channels, a dedicated volume change key 230 for adjusting volume, and a dedicated view change key 240 for adjusting the view indices for the view change effect.

Figure 3:
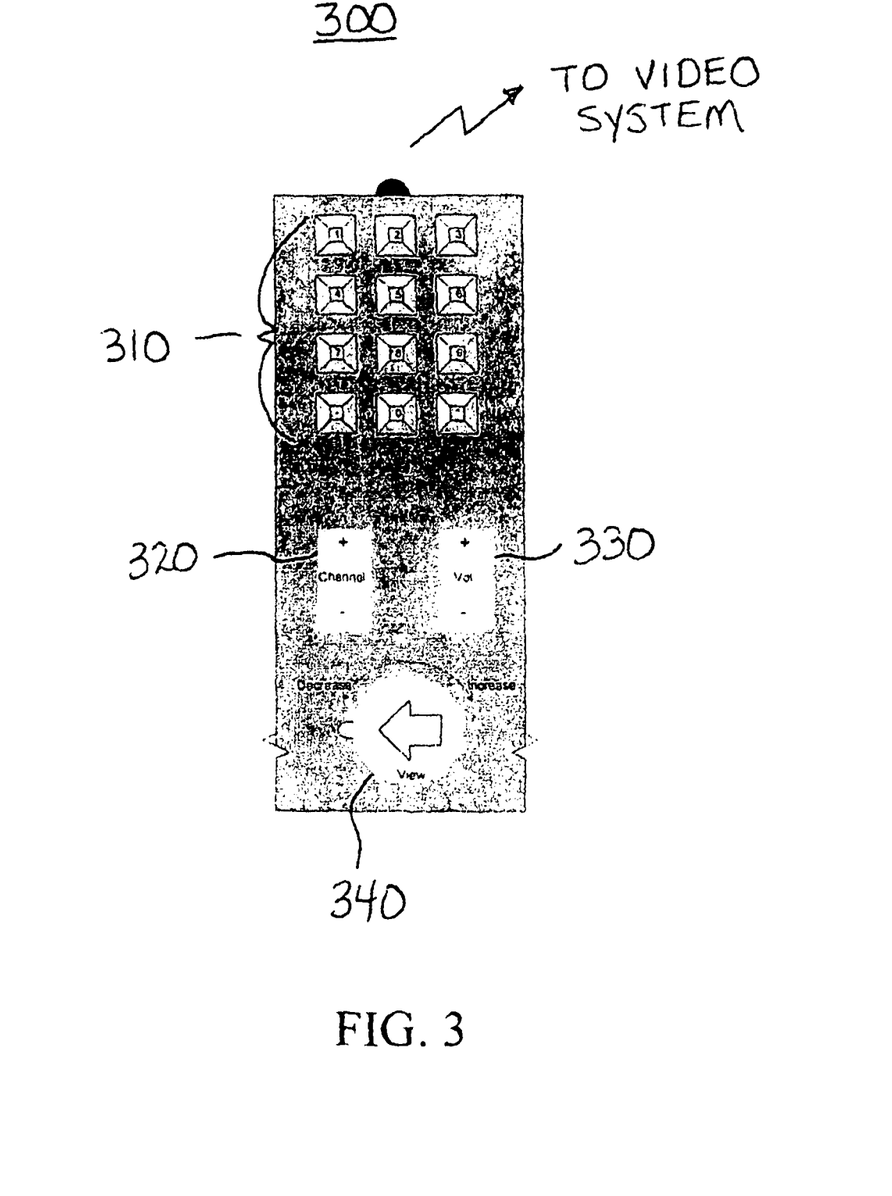
FIG. 3 shows a user perspective view of a remote control device according to another exemplary embodiment of the present invention.

According to another exemplary embodiment, a remote control 300, as shown in FIG. 3, may be used to adjust the view indices for the view change effect. As shown in FIG. 3, remote control device 300 comprises a numerical keypad 310, a dedicated channel change key 320 for changing channels, a dedicated volume change key 330 for adjusting volume, and a rotatable wheel key 340 which is particularly suitable for adjusting among an extremely large number of views, such as 1024 views as supported in the aforementioned MVC extension. Wheel key 340 may be convenient to select a desired viewpoint, such as for example, if there are 1024 cameras for a live game of football.

Wheel key 340 could also be substituted by a slider key, such as a touchpad slider (similar to the mouse of a laptop computer). This could be done from a smart phone or other device instead of a physical remote control device. For efficiency, wheel key 340 could also be used for fast and slow trick modes as well. Wheel key 340 may include start and end points, and may also default to the last selected setting after an adjustment is made. Of course, wheel key 340 does not have to be a physical wheel that rotates. For example, wheel key 340 may embodied as a touchable surface.

According to another exemplary embodiment, a numerical digit key (e.g., of numerical keypad 310 in FIG. 3) can be used to select which view a user wants to watch. Also with this embodiment, the numerical digit key for view change may be shared with, for example, a channel change key, in which case a key may be added for enabling the switch between channel/view adjustment functionality.

According to another exemplary embodiment, controller/memory 20 of FIG. 1 includes motion-based control functionality. For example, according to this exemplary embodiment, swinging remote control device 100 to the left changes the views to the left, while swinging remote control device 100 to the right changes the views to the right. Moreover, one right swing of remote control device 100 increases a view number by one, and one left swing of remote control device 100 to the left decreases the view number by one. Such motion-based control functionality extends to all of the exemplary embodiments of remote control devices disclosed herein.

Depth Change Effect

People may have various depth perceptions for three-dimensional (3-D) displays. For example, the visual depth perception of adults and children may be quite different. According to principles of the present invention, the user is able to adjust a three-dimensional depth setting when watching a video presentation (e.g., television). In multi-view cases (where no virtual views can be rendered due to the lack of depth information for example), the perceived depth can be adjusted by fixing one of the views (e.g., the left view) while changing the selection of the other view (e.g., the right view). Once the right and left views are the same, a two-dimensional (2-D) version (with no 3-D effect) is displayed.

Figure 4:
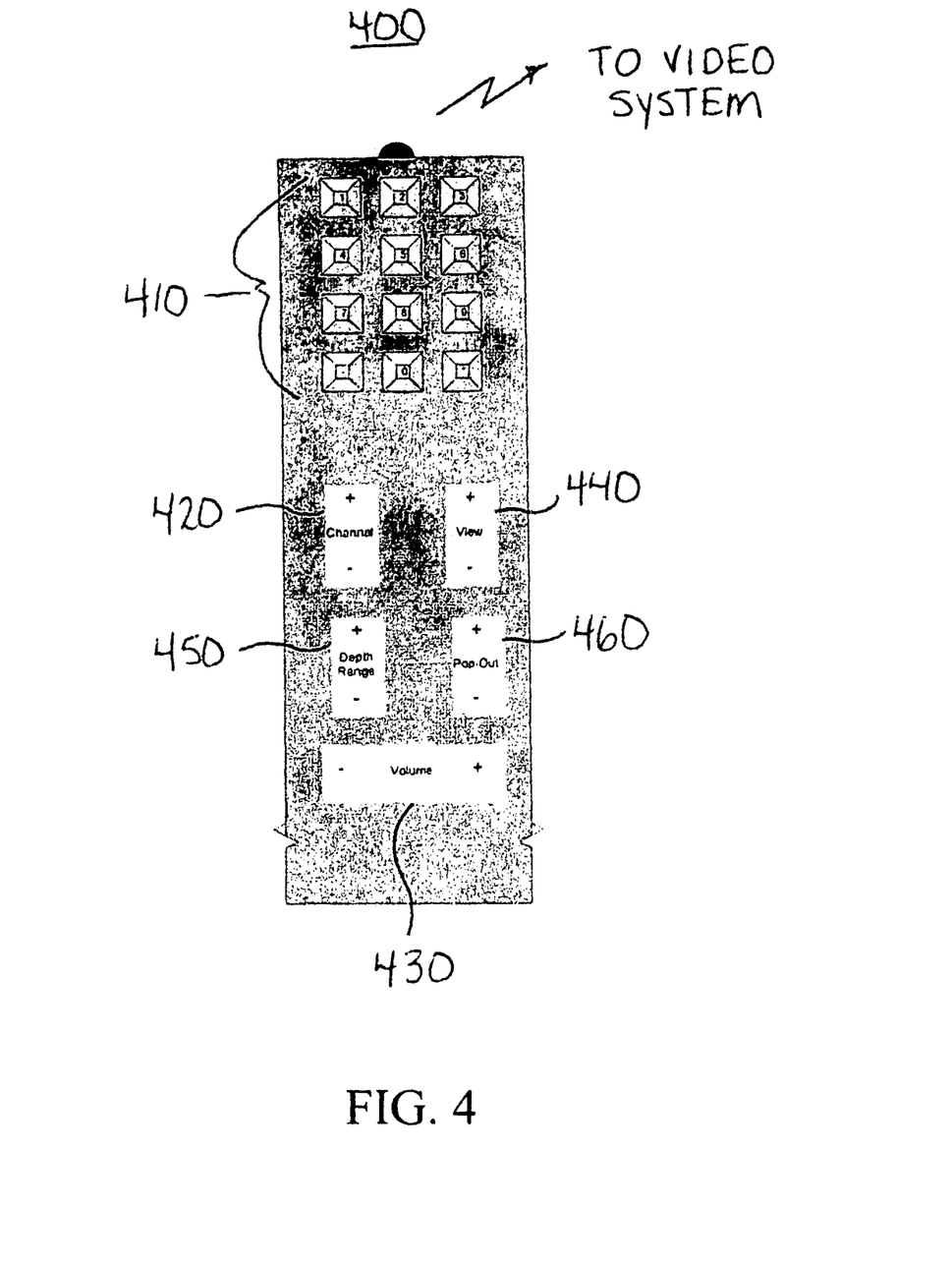
FIG. 4 shows a user perspective view of a remote control device according to still another exemplary embodiment of the present invention.

According to an exemplary embodiment, a key of the remote control device with ("+") and ("−") indicators may be used to increase ("+") or decrease ("−") the depth, for example by changing one of the views as described above in the multi-view cases. FIG. 4 shows an example of a remote control device 400 operative to perform this adjustment. In particular, remote control device 400 of FIG. 4 comprises a numerical keypad 410, a dedicated channel change key 420 for changing channels, a dedicated volume change key 430 for adjusting volume, a dedicated view change key 440 for adjusting the view indices for the view change effect, a dedicated depth range key 450 for adjusting the depth, and a dedicated pop-out key 460 for adjusting a pop-out effect, which will be described later herein.

The principles of the present invention may also be used to achieve a correct caption depth so that, for example, a text caption is always out in front of the video portion of a display and the depth-of-field of captioning does not change. In this manner, a user may adjust the depth-of-field of captioning for the three-dimensional (3-D) content, as desired. For example, some users may prefer the captions a little further outside of the front video plane than others.

Pop-Out Effect

The pop-out effect is a desirable feature for three-dimensional (3-D) video systems, and may be particularly appealing to children. According to an exemplary embodiment, a user is able to adjust the pop-out effect of a displayed video image by adjusting/shifting the global disparity between the left view and right view. In multi-view cases, the pop-out effect is adjusted by shifting the global disparity between the left and right views. According to an exemplary embodiment, pop-out key 460 on remote control device 400 of FIG. 4 described above may be used to adjust the pop-out effect. In particular, the ("+") and ("−") indicators of pop-out key 460 may be pressed to increase ("+") and decrease ("−") the pop-up effect, respectively.

Figure 5:
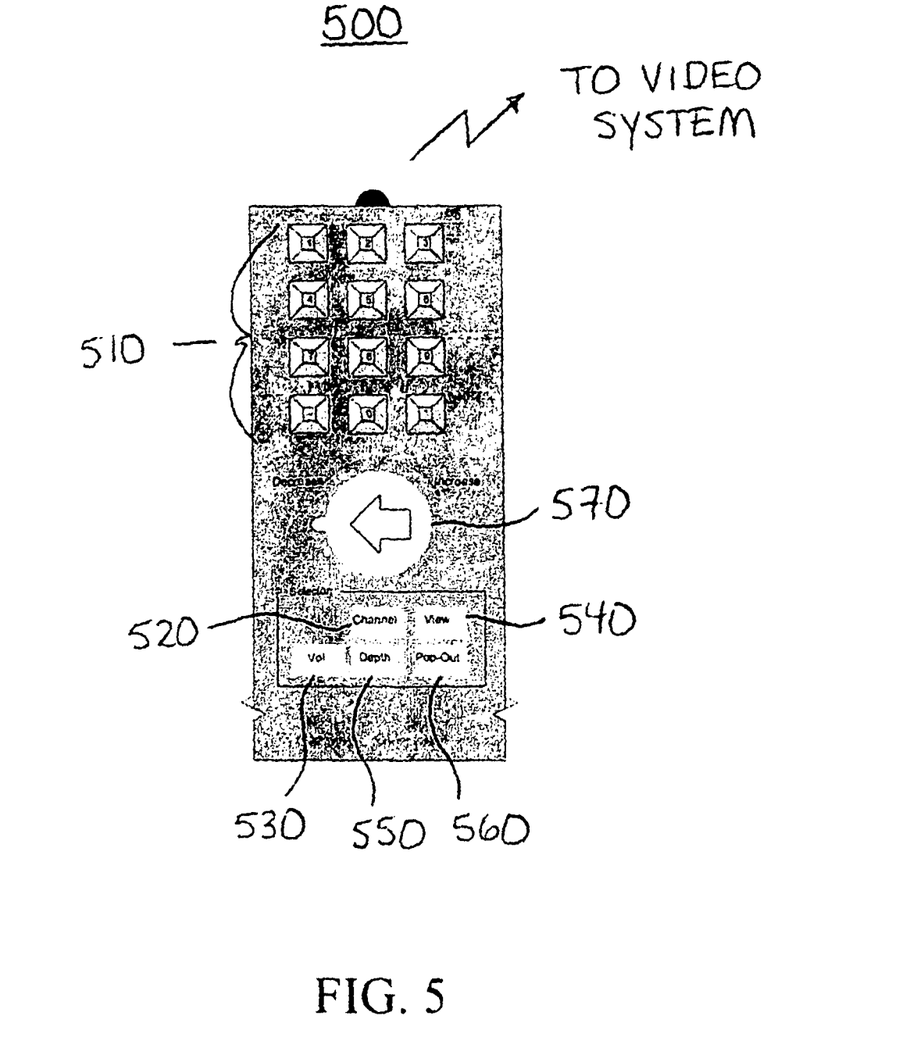
FIG. 5 shows a user perspective view of a remote control device according to yet another exemplary embodiment of the present invention.

The aforementioned three-dimensional (3-D) viewing effects may also be supported in an efficient manner using a selector mechanism. Remote control device 500 of FIG. 5 shows an example of this type of configuration. As indicated in FIG. 5, remote control device 500 comprises a numerical keypad 510, and a selector mechanism that includes five (5) selectable option keys, namely a channel change option key 520, a volume change option key 530, a view change option key 540, a depth change option key 550, and a pop-out change option key 560. Remote control device 50 also includes a wheel key 570 (similar to wheel key 340 of FIG. 3) which is used to increase or decrease one of the aforementioned five (5) selectable options when selected. That is, if view change option key 540 is pressed, wheel key 570 may be used to adjust the view. Similarly, if depth change option key 550 is pressed, wheel key 570 may be used to adjust the depth, and so on. At the same time, numerical keypad 510 can also be used for different purposes.

Also according to an exemplary embodiment, another key (not shown in FIG. 5) may be added such that when this key is pressed together with a numerical digit key of numerical keypad 510, this indicates a user request to adjust one of the selector items of channel, volume, view, depth, and pop-out. For example, pressing this additional key with the digit key "1" indicates channel, combining the same with the digit key "2" indicates volume, and so on. In another exemplary embodiment, less frequently changed features (e.g., depth, pop-out effect, etc.) may be placed as a menu setting of the video system.

Figure 6:
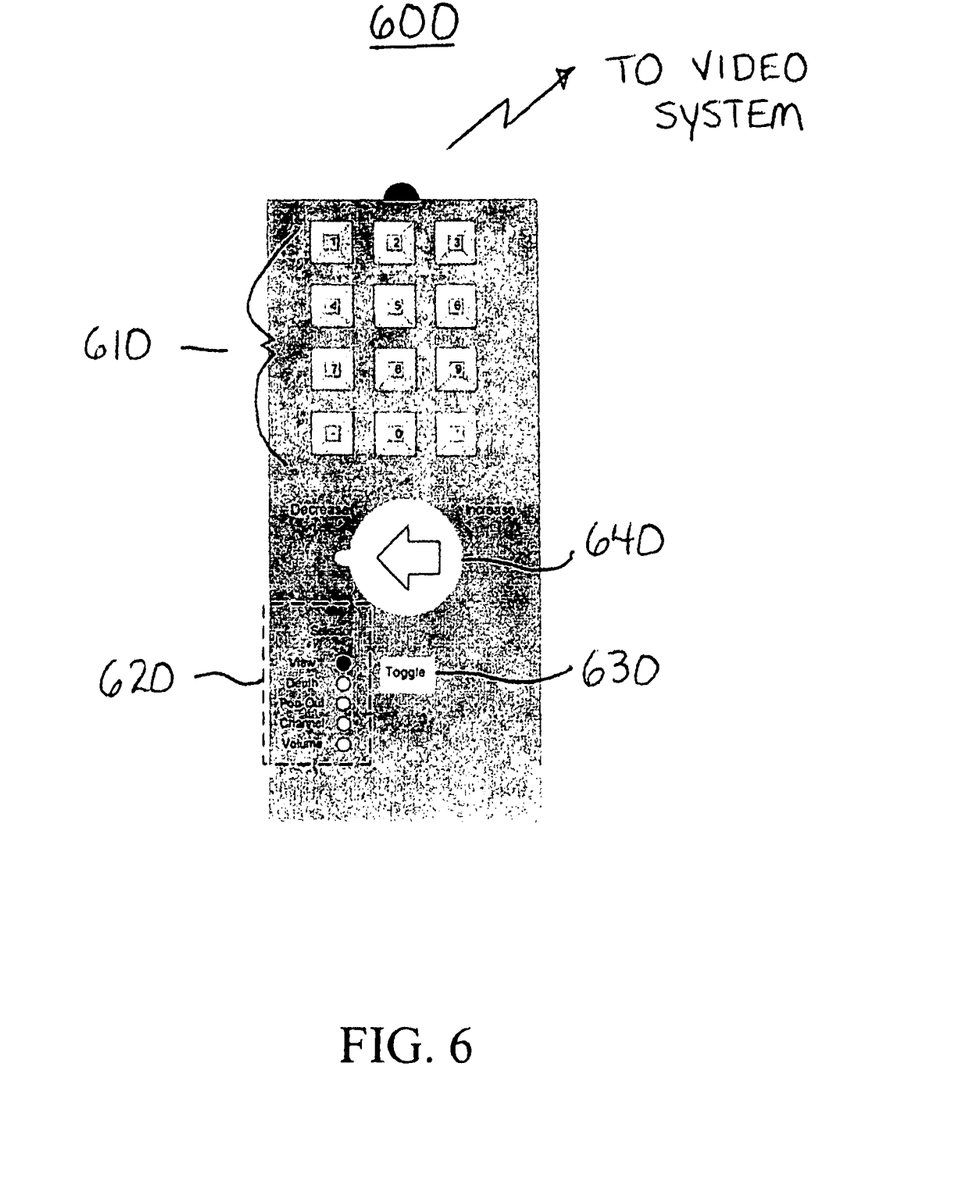
FIG. 6 shows a user perspective view of a remote control device according to still yet another exemplary embodiment of the present invention.

FIG. 6 shows a user perspective view of a remote control device 600 according to still yet another exemplary embodiment of the present invention. Remote control device 600 of FIG. 6 is a variation of remote control device 500 of FIG. 5, and provides the ability to let users know which mode is selected. As indicated in FIG. 6, remote control device 600 comprises a numerical keypad 610, a selector indicator 620, a toggle key 630, and a wheel key 640 (similar to wheel key 570 of FIG. 5). Selector indicator 620 may, for example, be embodied as a series of LEDs with corresponding labels. By pressing toggle key 630, a user may sequentially select each selectable option (i.e., view, depth, pop-out, channel, volume) of selector indicator 620. Once a given option of selector indicator 620 is selected (e.g., as indicated by its illumination), wheel key 640 may be rotated to selectively increase and/or decrease the setting of that option.

For each of the device functions and three-dimensional (3-D) viewing effects described above, a single selector key (e.g., toggle key 630 of FIG. 6) may be used in practice in various different ways. For example, the selector key may be used in combination with an increase/decrease device (e.g., wheel key 640 of FIG. 6, slider, etc.) to send unique key codes to a video system based on what option is selected. That is, if the channel change function is selected and an increase input is provided, a key code indicating a "channel up" command is sent to the video system. Similarly, if the view change effect is selected and an increase input is provided, a key code indicating a "view increase" command is sent to the video system. This type of functionality may be programmed into the remote control device (i.e., into controller/memory 20 of FIG. 1), and also requires the video system that enables viewing to understand the key codes. This could be the case for the other embodiments as well, using discrete selector buttons instead of a single selector key.

In the exemplary embodiment of FIG. 5 described above, for example, another option is to make each selectable option key send out a discrete code that the video system would retain as a "modifier" to any increase or decrease codes (i.e., both increase and decrease inputs would send a discrete code). This embodiment requires the video system to store and retain the last selected mode.

Alternately, generic key codes could be sent from the remote control device for only three (3) things, namely: a unique key code for option/mode selection, increase, and decrease. The video system receiving such inputs would use those keys and keep the state for itself. This embodiment offers great flexibility and a simplified remote control device, but provides less feedback to the user as to what mode they are in. However, this embodiment does allow for a number of other desirable effects. For example, it allows for future expansion (e.g., if a video system offers a new option/feature that can take advantage of an increase/decrease mechanism, the system could add it to the list of selectable options and the user could access it simply by pressing the selector key until the correct option/feature is selected), and also allows the video system to manipulate the list of selectable options, so, for example, if the user decides he will never change the pop-out or the depth, but does want the ability to change the channel, volume, and view, he could remove the undesired options from the list, so the selector key would only toggle through those options that are of interest to the user. Of course, since channel and volume are both used a lot, they may still retain their own dedicated key.

Figure 7:
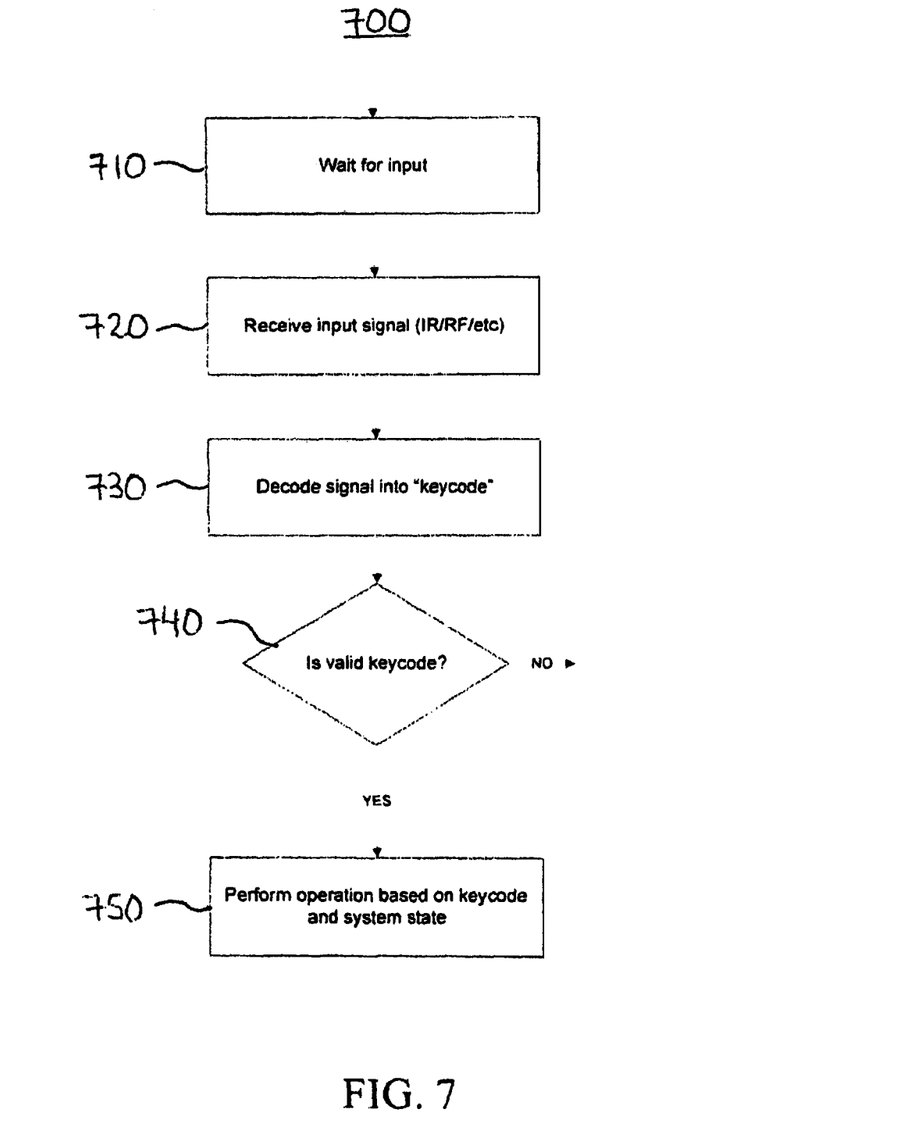
FIG. 7 shows a flowchart illustrating steps according to an exemplary embodiment of the present invention.

Referring to FIG. 7, a flowchart 700 illustrating steps according to an exemplary embodiment of the present invention is shown. According to an exemplary embodiment, the steps of FIG. 7 are performed by a video system that receives user input signals from a remote control device, such as remote control device 100 in any of its exemplary embodiments disclosed herein. In this manner, the steps of FIG. 7 represent exemplary standard device operation.

At step 710, the video system waits for a user input signal. At step 720, the video system receives a user input signal, such as an IR or RF signal, from a remote control device such as remote control device 100. At step 730, the video system decodes the received signal into a key code, such as one of the key codes described above herein. At step 740, the video system determines if the key code produced at step 730 is valid. That is, the video system determines if the key code corresponds to a recognized operation/function.

If the determination at step 740 is negative, process flow loops back to step 710 and continues as shown in FIG. 7. Alternatively, if the determination at step 740 is positive, process flow advances to step 750 where the video system performs an operation based on the key code and the system state. For example, the video system may adjust the channel, volume, view, depth or pop-out based on the key code and the system state. From step 750, process flow loops back to step 710 and continues as shown in FIG. 7.

Figure 8:
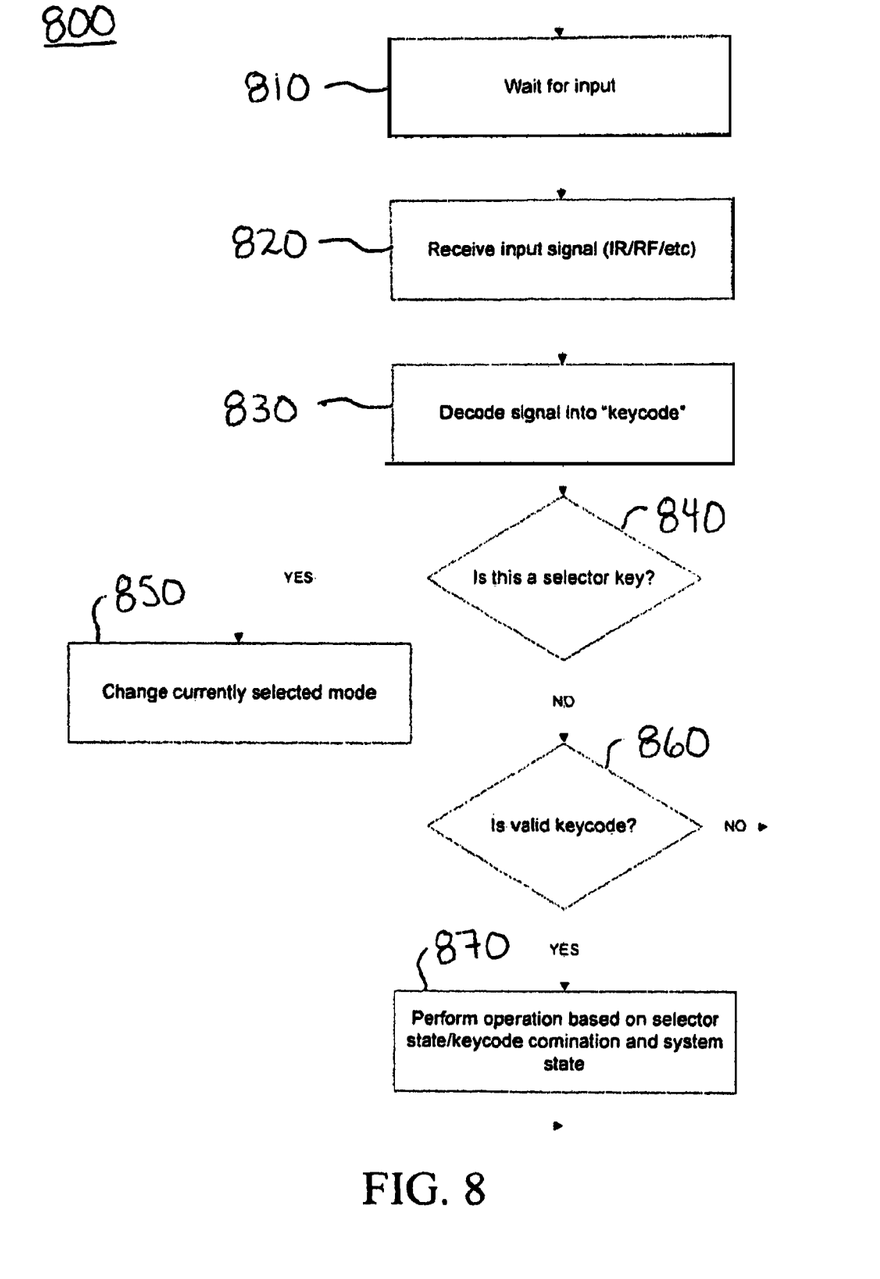
FIG. 8 shows a flowchart illustrating steps according to another exemplary embodiment of the present invention.

Referring to FIG. 8, a flowchart 800 illustrating steps according to another exemplary embodiment of the present invention is shown. According to an exemplary embodiment, the steps of FIG. 8 are performed by a video system that receives user input signals from a remote control device, such as remote control device 500 of FIG. 5, having multiple option/mode selector keys (e.g., keys 520-560).

In FIG. 8, steps 810-830 correspond respectively to steps 710-730 of FIG. 7 described above, and therefore, will not be described again for clarity of description. At step 840, the video system makes a determination as to whether the received user input signal represents an input of one of the selector keys (e.g., one of keys 520-560 of FIG. 5). If the determination at step 840 is positive, process flow advances to step 850 where the video system changes its currently selected mode. For example, the video system may switch from the view change mode to the depth change mode or from the channel change mode to the volume change mode, etc. From step 850, process flow loops back to step 810 and continues as shown in FIG. 8.

If the determination at step 840 is negative, process flow advances to step 860 where the video system determines if the key code produced at step 830 is valid. That is, the video system determines if the key code corresponds to a recognized operation/function. If the determination at step 860 is negative, process flow loops back to step 810 and continues as shown in FIG. 8. Alternatively, if the determination at step 860 is positive, process flow advances to step 870 where the video system performs an operation based on the selector state/key code combination and the system state. For example, the video system may adjust the channel, volume, view, depth or pop-out based on the key code and the system state. From step 870, process flow loops back to step 810 and continues as shown in FIG. 8.

Figure 9:
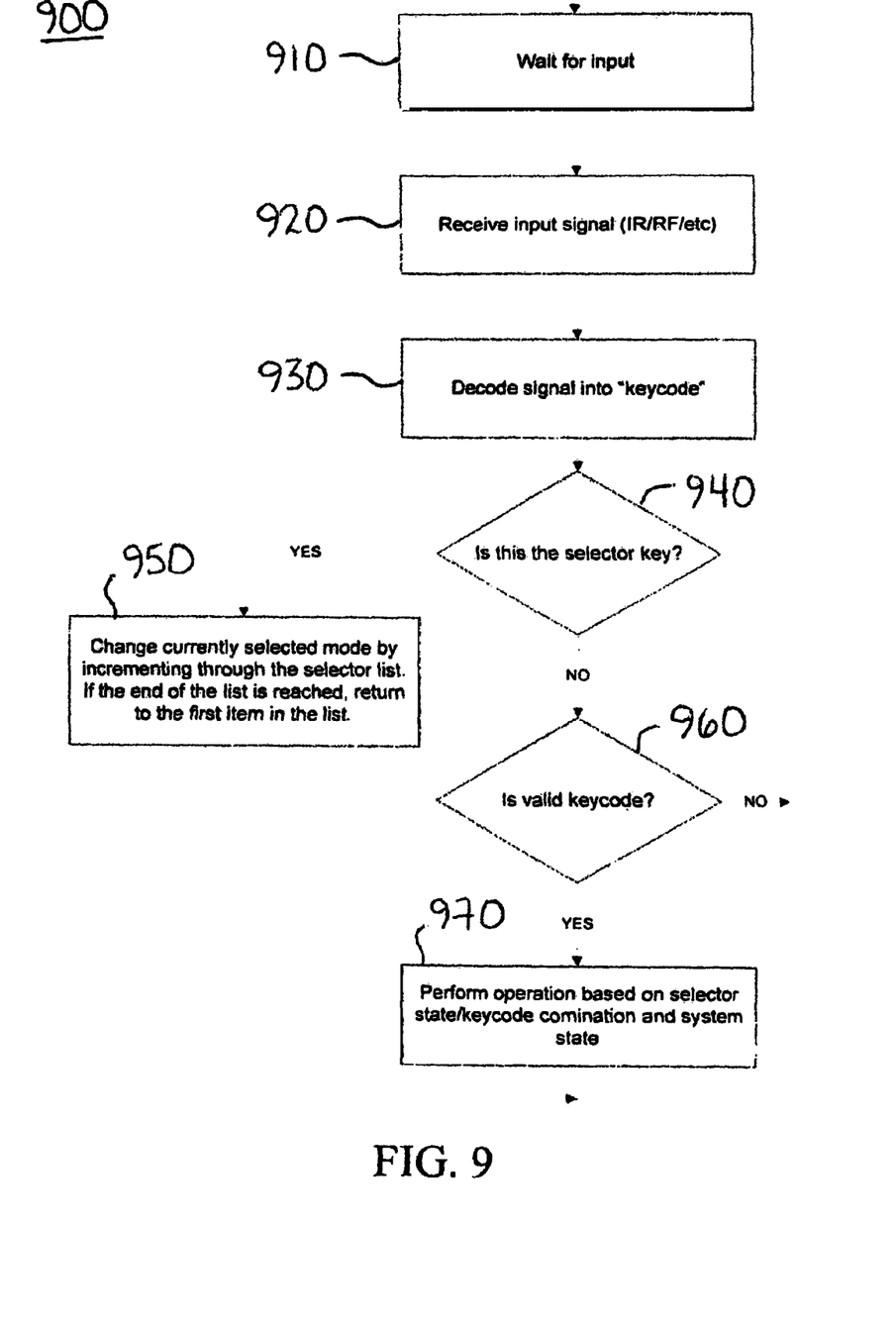
FIG. 9 shows a flowchart illustrating steps according to still another exemplary embodiment of the present invention.

Referring to FIG. 9, a flowchart 900 illustrating steps according to still another exemplary embodiment of the present invention is shown. According to an exemplary embodiment, the steps of FIG. 9 are performed by a video system that receives user input signals from a remote control device, such as remote control device 600 of FIG. 6, having a single selector key (e.g., toggle key 630).

In FIG. 9, steps 910-930 correspond respectively to steps 710-730 of FIG. 7 and steps 810-830 of FIG. 8 described above, and therefore, will not be described again for clarity of description. At step 940, the video system makes a determination as to whether the received user input signal represents an input of the single selector key (e.g., toggle key 630 of FIG. 6). If the determination at step 940 is positive, process flow advances to step 950 where the video system changes its currently selected mode by incrementing through the selector list (e.g., the list of selector indicator 620 of FIG. 6). If the last item in the list is reached, the video system returns back to the first item in the list. From step 950, process flow loops back to step 910 and continues as shown in FIG. 9.

If the determination at step 940 is negative, process flow advances to step 960 where the video system determines if the key code produced at step 930 is valid. That is, the video system determines if the key code corresponds to a recognized operation/function. If the determination at step 960 is negative, process flow loops back to step 910 and continues as shown in FIG. 9. Alternatively, if the determination at step 960 is positive, process flow advances to step 970 where the video system performs an operation based on the selector state/key code combination and the system state. Step 970 of FIG. 9 corresponds to step 870 of FIG. 8. From step 970, process flow loops back to step 910 and continues as shown in FIG. 9.

As described above, the present invention provides various different embodiments of a remote control device operative to enable and facilitate user control of video systems operative to provide, among other things, one or more three-dimensional (3D) viewing effects.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A remote control device, comprising:
   a user input terminal including a selector operative to receive a first user input selecting for adjustment one of a plurality of user settings of a video system, said user settings including a volume setting, a channel setting and a three-dimensional (3-D) viewing effect, said user input terminal also including an input element operative to receive a second user input to adjust a selected one of said volume setting, said channel setting and said three-dimensional (3-D) viewing effect of said video system; and
   a transmitter operative to transmit a control signal to said video system in response to said second user input.

2. The remote control device of claim 1, wherein adjusting said three-dimensional (3-D) viewing effect of said video system includes changing a current three-dimensional (3-D) view setting to another three-dimensional (3-D) view setting.

3. The remote control device of claim 2, wherein said three-dimensional (3-D) viewing effect comprises at least one of: a view change effect, a depth change effect and a pop-out effect.

4. The remote control device of claim 3, wherein each of said three-dimensional (3-D) viewing effects is based on a video signal received by said video system having at least three different views for each video frame of said received video signal.

5. The remote control device of claim 4, wherein for each said video frame, two of said at least three different views are provided as a corresponding right/left pair.

6. The remote control device of claim 4, wherein adjusting said view change effect comprises changing two of said at least three different views for each said video frame at the same time.

7. The remote control device of claim 4, wherein adjusting said depth change effect comprises changing one of said at least three different views for each said video frame.

8. The remote control device of claim 4, wherein adjusting said pop-out effect comprises shifting global disparity between two of said at least three different views for each said video frame.

9. The remote control device of claim 1, wherein said input element is a single rotatable element.

10. A method for operating a remote control device, comprising:
receiving, via said remote control device, a first user input selecting for adjustment one of a plurality of user settings of a video system, said user settings including a volume setting, a channel setting and a three-dimensional (3-D) viewing effect;
receiving, via said remote control device, a second user input to adjust a selected one of said volume setting, said channel setting and said three-dimensional (3-D) viewing effect of said video system; and
transmitting a control signal to said video system in response to said second user input.

11. The method of claim 10, wherein adjusting said three-dimensional (3-D) viewing effect of said video system includes changing a current three-dimensional (3-D) view setting to another three-dimensional (3-D) view setting.

12. The method of claim 11, wherein said three-dimensional (3-D) viewing effect comprises at least one of: a view change effect, a depth change effect and a pop-out effect.

13. The method of claim 12, wherein each of said three-dimensional (3-D) viewing effects is based on a video signal received by said video system having at least three different views for each video frame of said received video signal.

14. The method of claim 13, wherein for each said video frame, two of said at least three different views are provided as a corresponding right/left pair.

15. The method of claim 13, wherein adjusting said view change effect comprises changing two of said at least three different views for each said video frame at the same time.

16. The method of claim 13, wherein adjusting said depth change effect comprises changing one of said at least three different views for each said video frame.

17. The method of claim 13, wherein adjusting said pop-out effect comprises shifting global disparity between two of said at least three different views for each said video frame.

* * * * *